M. A. STEWART.
LAWN MOWER.
APPLICATION FILED DEC. 8, 1910.
1,048,908.
Patented Dec. 31, 1912.
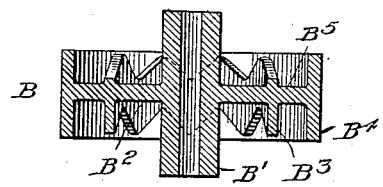
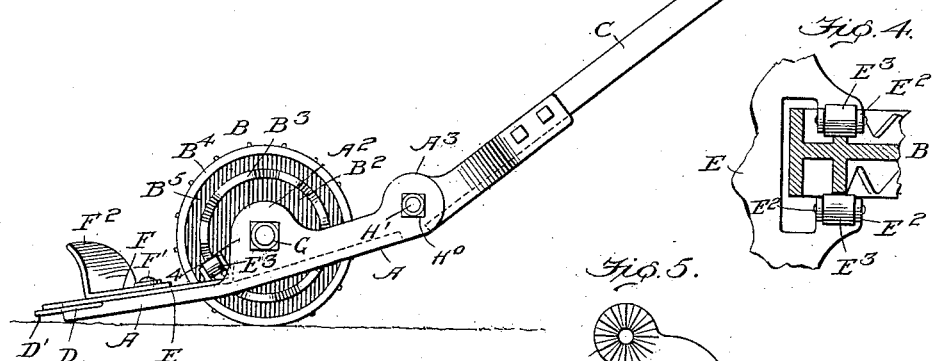
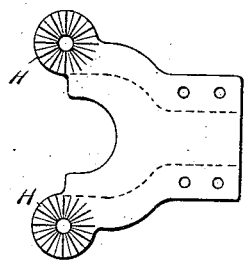
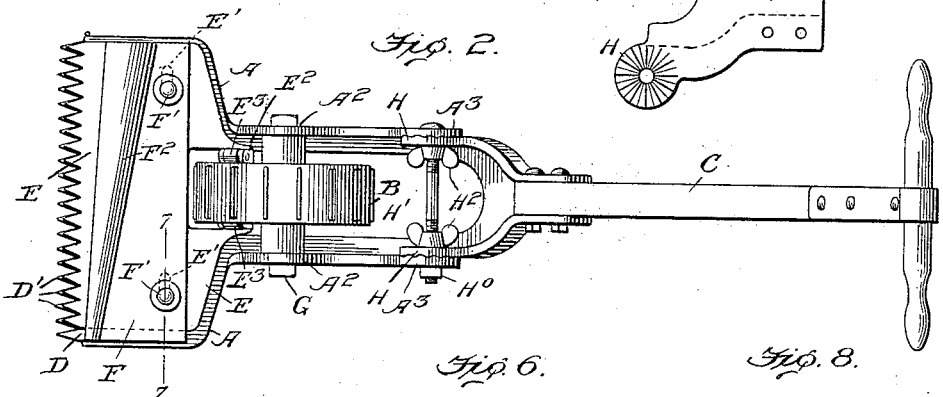
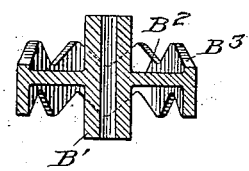
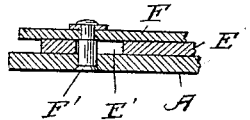
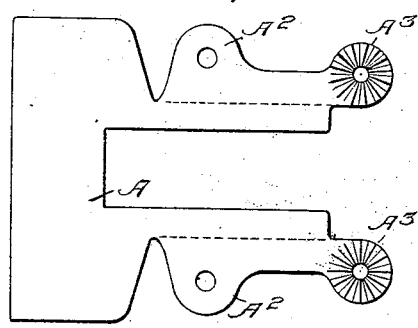

UNITED STATES PATENT OFFICE.

MATTHEW A. STEWART, OF NEWARK, NEW JERSEY.

LAWN-MOWER.

1,048,908.  Specification of Letters Patent.  Patented Dec. 31, 1912.

Application filed December 8, 1910. Serial No. 596,241.

*To all whom it may concern:*

Be it known that I, MATTHEW A. STEWART, a citizen of the United States, residing at Newark, in the county of Essex and State of New Jersey, have invented certain new and useful Improvements in Lawn-Mowers, of which the following is a specification, reference being had therein to the accompanying drawing.

The general object of this invention is to produce an unusually simple and inexpensive lawn mower of the reciprocating cutter type, adapted to cut grass alongside walls or depressions in the ground in corners, as well as elsewhere. The machine involves the use of a supporting wheel provided with circumferential cams adapted to throw the cutter back and forth as the wheel is rotated by pushing the machine forward.

In the accompanying drawings, Figure 1 shows the machine in side elevation. Fig. 2 is a plan view of the same devices. Fig. 3 shows an axial section of the supporting and driving wheel. Fig. 4 is a section on the line 4—4, Fig. 1. Fig. 5 is a plan view of a blank to be bent into shape for holding the lower end of the handle. Fig. 6 shows in like manner the blank for the main frame. Fig. 7 is a section on the line 7—7, Fig. 2. Fig. 8 is a section similar to Fig. 3, illustrating a modification.

In these views, A represents the main frame or bed plate, which is preferably supported by a single wheel, B, in the medial plane of the machine and is guided by a handle C, the inclination of which with respect to the frame is adjusted at will, to suit the height of the user, for example. Preferably the main frame is formed from a plane steel plate by cutting and punching it as indicated in Fig. 6 and bending certain lateral portions upward, for stiffening and to form bearings. Upon the front, marginal portion of the frame is removably fixed a steel cutting plate D having cutting teeth D' and just above this plate is mounted a similarly toothed reciprocating steel plate E which is held by a guard plate F and studs F', the latter passing through slots E' in the plate E. The latter plate is thus allowed to move back and forth with its teeth sliding over the teeth of the plate D and co-acting with them in cutting the grass. From the right and left of the rear side of the body of the plate A portions project rearward and bear lugs $A^2$ and $A^3$, the former serving as bearings for the shaft G of the supporting and driving-wheel B, and the latter receiving, as will be seen, the attaching devices of the handle C. The wheel B usually comprises a hub B', a central web, $B^2$, a false rim of cam $B^3$ having parallel lateral, zigzag faces, and a broad true rim $B^4$ extending, on each side of the wheel web $B^5$, beyond the marginal planes of the false rim or cam. This true rim rests upon or engages the ground and protects the cam-faces from matter which might otherwise adhere to them. This wheel is so placed that its front side nearly reaches the body of the plate A and the corresponding part of the cutting plate E. The latter plate has at its rear edge projections to engage the cam upon each side, rollers $E^3$ mounted in lugs $E^2$ preferably being employed to avoid friction.

It is obvious from the construction that when the machine is pushed forward, the cam causes a rapid oscillation of the plate E. The lower teeth preferably project slightly beyond the upper ones so that the cutting margins cannot strike objects of such size that they cannot pass between the teeth, and the main plate A preferably extends upon each side slightly beyond the path of the reciprocating plate, thus serving as a fender. In some cases, the wheel rim and its supporting web are omitted, as indicated in Fig. 8, the false rim or cam in that case rolling along the ground.

The handle is provided with parallel, radially corrugated disks H by bending the plate of Fig. 5 to proper form and securing it to the body of the handle, and the parts are so proportioned that these disks may lie between and co-act with the like corrugated ears $A^3$, and a removable bolt H' passes through the disks and ears and is secured by a nut H°. The pairs of co-acting disks and ears are clamped together by wing nuts $H^2$ or the like. By loosening these nuts, the handle is so far freed that it may swing on the bolt through any desired angle, when it is secured in the new position by means of the nuts. The cut grass is thrown to one side by means of the oblique, upturned and forwardly curved portion $F^2$ of the guard plate F. Obviously, the machine may be provided with the usual adjustable shoes or wheels for regulating the distance of the cutting devices from the ground, but these are not shown.

What I claim is:

1. In a lawn mower, the combination with a one-piece, forwardly toothed frame plate comprising a plane body, a narrower, rearwardly extending central portion slotted to receive a central driving wheel, and upwardly turned marginal portions perforated to receive a wheel shaft and a handle attaching bolt, of a driving wheel mounted in the slot with its shaft held in a pair of the perforations, a handle in pivotal connection with said portions, means for adjustably fixing the angle made by the handle and frame plate, and a toothed cutter plate co-acting with the toothed frame plate and reciprocated by said wheel.

2. In a lawn mower, the combination with a frame having in front a stationary cutting member and at its rear side two widely separated vertical ears, a single supporting and driving wheel mounted centrally in the rear portion of the frame, a cutting plate carried on the frame and laterally reciprocated by said wheel to co-act with said cutting member, a handle having widely separated arms provided with terminal disks for engaging said ears, respectively, a bolt passing through the pairs of ears and disks, and means carried by the bolt for clamping each disk to the corresponding ear.

3. In a lawn mower, the combination with a forwardly toothed frame plate having its rear portion slotted to receive a supporting and driving wheel and provided with ears to receive a wheel shaft and handle bolts, of a handle secured to the rear portion of the frame plate, means for varying the angle of the handle and frame plate, a supporting and driving wheel mounted in the slot of the frame plate and having a web provided on each side, at some distance within the wheel rim, with a cam having sinuous lateral edges, and a toothed cutter plate co-acting with the toothed frame plate and reciprocated by the sinuous edges, substantially as set forth.

In testimony whereof I affix my signature in presence of two witnesses.

MATTHEW A. STEWART.

Witnesses:
RUSSEL NEWELL,
C. E. JOHNSON.

---

Copies of this patent may be obtained for five cents each, by addressing the "Commissioner of Patents, Washington, D. C."